United States Patent
Robins et al.

(10) Patent No.: US 6,952,528 B2
(45) Date of Patent: Oct. 4, 2005

(54) VARIABLE FORCE CAMERA CONTROL

(75) Inventors: Mark N. Robins, Greeley, CO (US); Heather N. Bean, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 12 days.

(21) Appl. No.: 10/727,873

(22) Filed: Dec. 3, 2003

(65) Prior Publication Data

US 2005/0123291 A1 Jun. 9, 2005

(51) Int. Cl.[7] ................................................. G03B 17/38
(52) U.S. Cl. ....................... 396/263; 396/502; 396/543
(58) Field of Search ................................ 396/263, 502, 396/543

(56) References Cited

U.S. PATENT DOCUMENTS

| | | | |
|---|---|---|---|
| 3,696,908 A | 10/1972 | Gluck et al. | |
| 4,295,715 A | * 10/1981 | Breen | 396/132 |
| 4,749,878 A | 6/1988 | Snyder et al. | |
| 4,899,631 A | 2/1990 | Baker | |
| 5,220,318 A | * 6/1993 | Staley | 341/34 |
| 6,270,251 B1 | * 8/2001 | Bron | 368/320 |

OTHER PUBLICATIONS

Key Tronic, Product Specs Keyboards, E03600 keytronic.com/home/products/specs/e03600.htm, printed Nov. 24, 2003, 2 pages.

* cited by examiner

Primary Examiner—David M. Gray
(74) Attorney, Agent, or Firm—David W. Boyd

(57) ABSTRACT

A camera is adjustable such that the force required to actuate one or more of the camera's controls can be adjusted by a camera user. In a preferred embodiment, the force required to depress the camera's shutter release button is adjustable. The force may be adjusted to accommodate changing photographic situations, to accommodate a physical disability of the photographer, or simply to accommodate the camera user's taste. Mechanical and electromechanical embodiments are disclosed.

15 Claims, 3 Drawing Sheets

VARIABLE FORCE CAMERA CONTROL

FIELD OF THE INVENTION

The present invention relates generally to photography.

SUMMARY OF THE INVENTION

A camera is adjustable such that the force required to actuate one or more of the camera's controls can be changed by a camera user.

DETAILED DESCRIPTION OF THE PREFERRED EMBODIMENT

Figure 1:
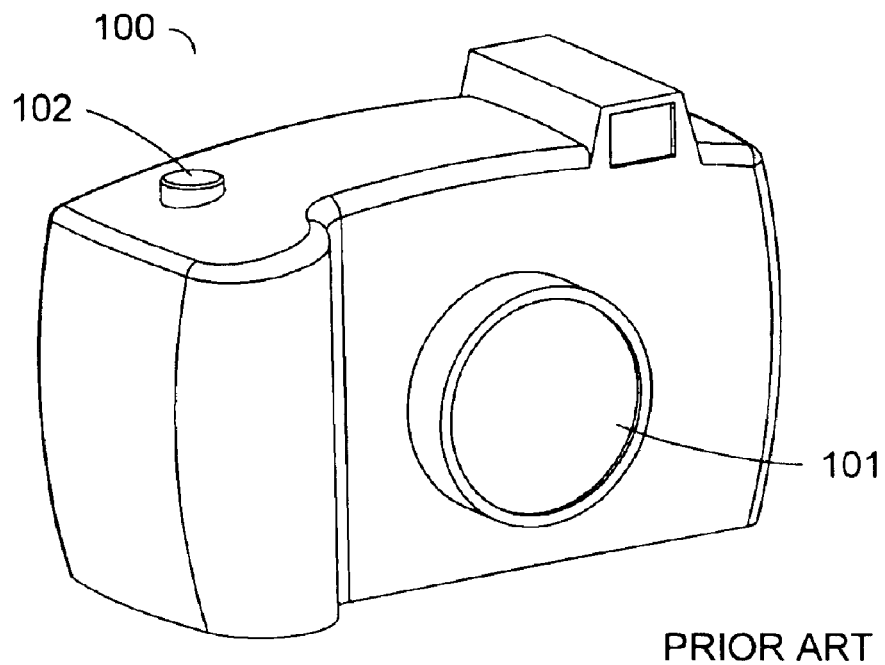
FIG. 1 depicts a typical camera.

FIG. 1 depicts a typical camera 100, which may be a digital camera or a film camera. Camera 100 uses a lens 101 to collect light emanating from a scene, and redirects the collected light to project an image of the scene on a light-sensitive element. The light sensitive element may be photographic film in the case that camera 100 is a film camera, or may be an electronic sensor in the case that camera 100 is a digital camera.

A user of the camera instigates the taking of a photograph by depressing a shutter release button 102. For the purposes of this disclosure a "shutter release" is a camera control that causes a photograph to be taken, whether or not the camera actually comprises a mechanical shutter or performs the equivalent function electronically.

Figure 2A:
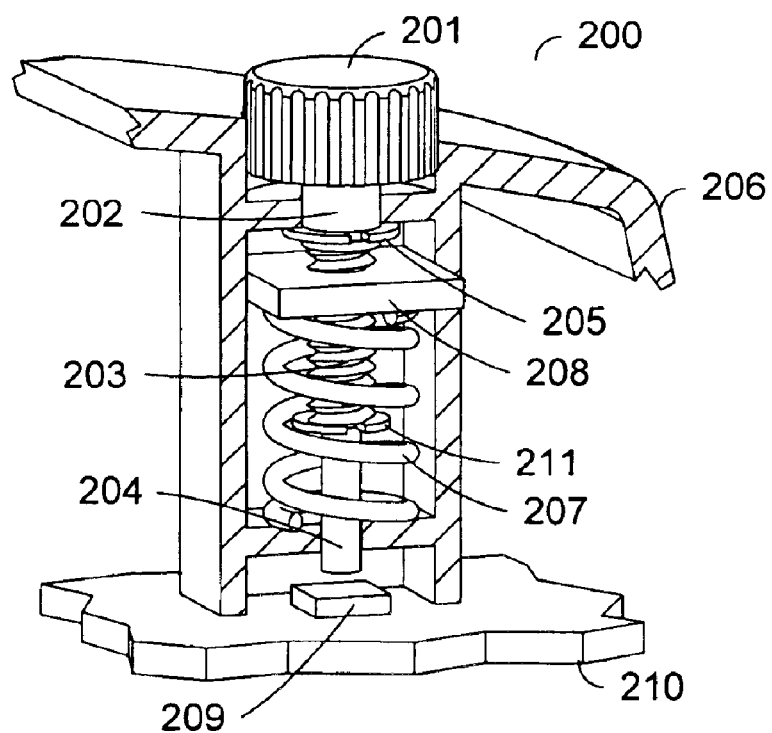
FIG. 2A depicts a shutter release in accordance with an example embodiment of the invention, in a first adjusted position.

FIG. 2A depicts a cutaway view of camera 100, showing a shutter release 200 in accordance with an example embodiment of the invention. Shutter release button 201 is attached to or integral with stepped shaft 202. Stepped shaft 202 further comprises a threaded portion 203 and an unthreaded distal end 204. Snap ring 205 constrains shutter release button 201 in camera body 206. Compression spring 207 exerts an upward force on shutter button 201 by pressing against threaded square nut 208. Unthreaded distal end 204 of shutter release button 201 is near switch 209 mounted on circuit board 210.

The camera user operates shutter release 200 by moving shutter release button 201 downward, usually using an index finger, until unthreaded distal end 204 encounters switch 209. Switch 209 may be a mechanical switch, capacitive switch, hall-effect device, or another kind of device that can detect the arrival of distal end 204 of shutter button 201. Switch 209 may provide one or more signals to a camera control unit (not shown) when shutter button 201 is actuated, indicating the downward progress of shutter button 201.

In the configuration shown in FIG. 2A, compression spring 207 is relatively unstressed, and exerts a relatively small upward force on shutter release button 201. For example, compression spring 207 may exert an upward force of 10 grams on shutter release button 201 when in the position shown in FIG. 2A, before actuation has begun. When shutter release 200 is configured as shown in FIG. 2A, the camera user can actuate it, thereby causing camera 100 to take a photograph, with relatively little force. The camera user may prefer this configuration due to personal taste, or for a particular photographic situation, such as delicate studio photography. In the configuration of FIG. 2A, relatively little force is imparted on camera 100 during the taking of a photograph, and correspondingly little camera motion may result.

Figure 2B:
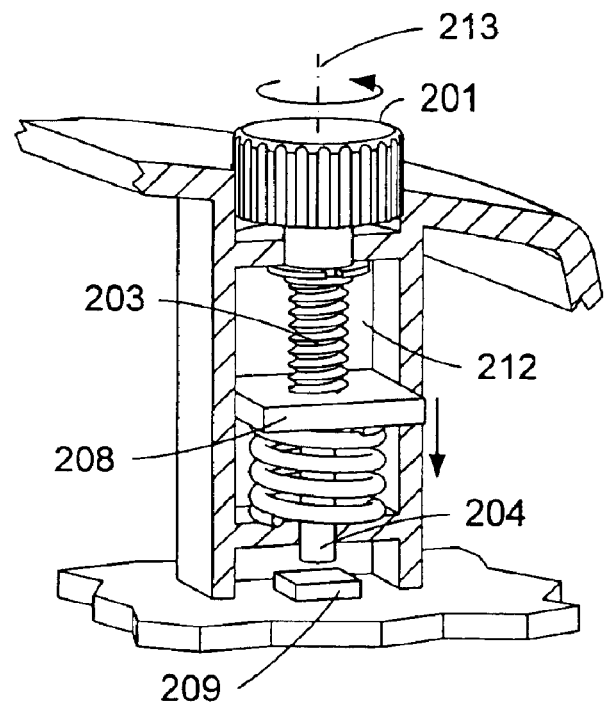
FIG. 2B depicts the shutter release in a second adjusted position.

Shutter release 200 is adjustable. Referring to FIG. 2B, when shutter release button 201 is rotated counterclockwise (as viewed from the top) about its axis of rotation 213, threaded square nut 208, by virtue of being constrained from rotation by rectangular recess 301, travels downward along threaded portion 203 of stepped shaft 202. In the process, compression spring 207 is compressed, and exerts increasing upward force on shutter button 201 in proportion to the travel of threaded square nut 208. For example, if compression spring 208 has a spring constant of 10 grams per millimeter, then for each millimeter threaded square nut 208 travels downward, the upward force exerted on shutter button 201 increases by 10 grams. Using the example figures so far given, if threaded square nut 208 travels downward by 5 millimeters, then the upward force on shutter release button 201 will be 60 grams, before actuation is begun. These figures are given by way of example only; other selections of travel and spring stiffness may be used. Second snap ring 211 (visible only in FIG. 2A) prevents threaded square nut 208 from traveling so far down threaded portion 203 that compression spring 207 can no longer provide enough compliance for distal end 204 to reach switch 209.

In the configuration of FIG. 2B, relatively more force is required to depress shutter release button 201. A camera user may prefer this configuration, or an intermediate one, due to personal taste or for use in a particular photographic situation. For example, on a photo safari, camera 100 may be subjected to much vibration and rough handling. Having a shutter release 200 that requires relatively more force for actuation may prevent accidental triggering of camera 100.

Turning shutter release button 201 in the opposite direction lengthens spring 207, thereby reducing the force with which it resists the actuation of shutter release button 201.

Figure 3:
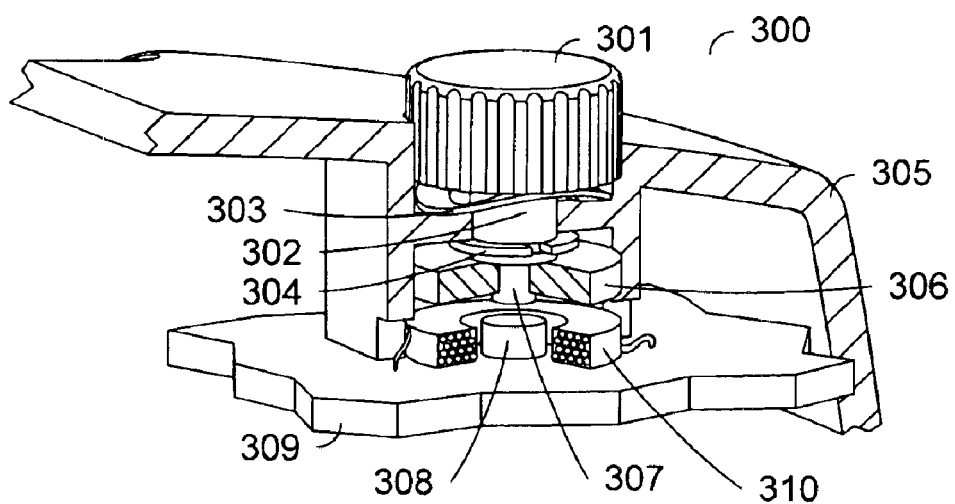
FIG. 3 depicts a shutter release in accordance with a second example embodiment of the invention.

FIG. 3 depicts a shutter release 300 in accordance with a second example embodiment of the invention. Shutter release button 301 is attached to or integral with stepped shaft 302. Wave spring 303 exerts a modest upward force on shutter release button 301. Snap ring 304 constrains shutter release button 301 to camera body 305. Ring magnet 306 is fixedly attached to stepped shaft 302, and produces magnetic flux in the vertical direction. Distal end 307 of stepped shaft 302 is near switch 308, which is mounted on circuit board 309. The operation of switch 308 may be similar to the operation of switch 209 previously described.

Wire coil 310 is mounted on circuit board 309 immediately below ring magnet 306. When electric current is passed through wire coil 310, magnetic flux is generated in the vertical direction. The resulting effect is to attract or repel ring magnet 306, and therefore also shutter release button 301, toward or away from wire coil 310, depending on the direction of current flow in wire coil 310 and the orientation of the poles of ring magnet 306. The force exerted on ring magnet 306 is proportional to the magnitude of the current flowing in wire coil 310 and the strength of ring magnet 306. The force is also inversely related to the distance between wire coil 310 and ring magnet 306. A control circuit 401, possibly on circuit board 309 and illustrated in FIG. 4, can adjust the magnitude of the current flowing in wire coil 310. The camera may provide an appropriate user control 402 for allowing the camera user to specify a force required for actuation, or a "stiffness," for shutter release button 301. The camera may increase the current magnitude such that an upward force is exerted on shutter release button 301, resisting the actuation of shutter release button 301 with a force that is to the user's taste. The force specification provided by the user may be in actual units of force, such as ounces or Newtons, or may be in quantitative but uncalibrated units, such as a simple numerical scale. Alternatively, the force specification may be a qualitative indication. For example, a control may provide settings for "Heavy" and "Light" forces, or for "Hard" and "Easy" actuation, or may use other similar terms.

In addition, the control circuit 401 and user control 402 may provide for reversing the direction of the current flow through wire coil 310, such that the magnetic force generated tends to attract shutter release button 301 toward wire coil 310, against the resistance of wave spring 303. This arrangement has the effect of assisting the actuation of shutter release button 301, making shutter release button 301 easier to press, as the user may desire for a particular photographic situation.

Figure 4:
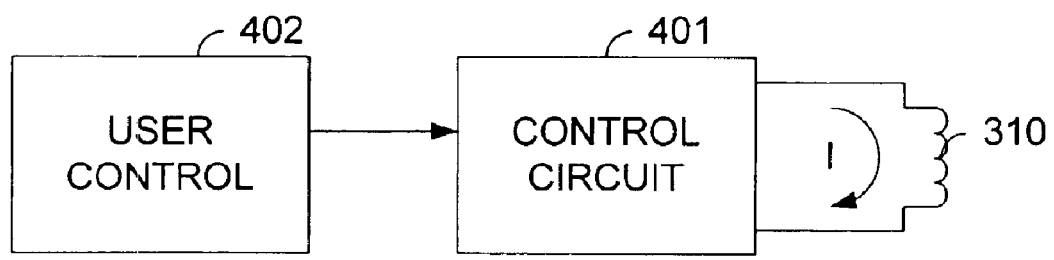
FIG. 4 illustrates a schematic block diagram of a portion of a camera in accordance with an example embodiment of the invention.

FIG. 4 illustrates a schematic block diagram of a portion of a camera in accordance with an example embodiment of the invention. A user control 402, which may be a button, dial, switch, or other control and may involve a displayed menu, allows a user to specify an actuation force for the shutter release 300. User control 402 signals the desired actuation force to control circuit 401. Control circuit 401 may contain a microprocessor system, discrete electronic components, integrated circuits, or a combination of these. Control circuit 401 adjusts the current "I" flowing through wire coil 301 in accordance with the force specified by the camera user by way of user control 402.

Figure 5:
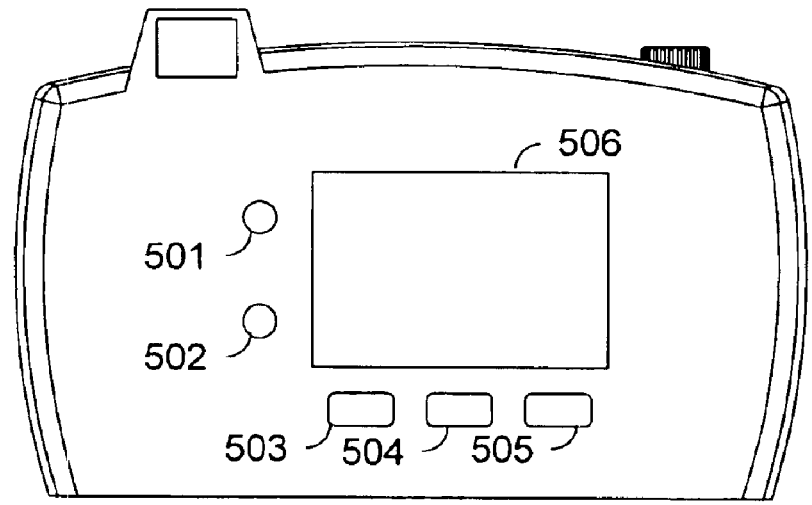
FIG. 5 shows a back view of a camera with several controls.

While a shutter release button serves as one example camera control in which the invention may be embodied, other camera controls may be adjustable as well. FIG. 5 shows a back view of a camera with several buttons 501–505. Buttons 501–505 are representative of controls that a camera user may use to adjust camera settings or operational modes. The controls may interact with menus or other information displayed on display 506.

A camera user may wish to adjust any or all of the buttons so that the force required to actuate them is at a preferred level. The user may wish to adjust the force for a particular photographic situation, or for personal taste. Such an adjustment may additionally be useful for accommodating certain physical disabilities of the camera user. For example, if the camera user suffers from a disability that compromises fine motor control, setting the camera controls to require a relatively high actuation force can reduce the possibility of accidental actuation.

The foregoing description of the present invention has been presented for purposes of illustration and description. It is not intended to be exhaustive or to limit the invention to the precise form disclosed, and other modifications and variations may be possible in light of the above teachings. For example, rather than compression spring 207, an arrangement may be envisioned that uses a tension spring whose length is increased to provide increased force resisting the actuation of shutter release button 201. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A camera, comprising:
   a control button;
   an axis of rotation of the control button; and
   a spring that resists the actuation of the control button;
   and wherein when the control button is rotated in an angular direction about its axis of rotation, a length of the spring is changed in a linear direction, thereby increasing the force with which the spring resists the actuation of the control button;
   and wherein the force is adjustable by a user of the camera.

2. The camera of claim 1, wherein when the control button is rotated in a second angular direction, opposite the first, about its axis of rotation, the length of the spring is changed in a second linear direction, opposite the first, thereby reducing the force with which the spring resists the actuation of the control button.

3. The camera of claim 1, wherein the camera is a film camera.

4. The camera of claim 1, wherein the camera is a digital camera.

5. The camera of claim 1, wherein the control button is a shutter release button.

6. A camera, comprising:
   a control button;
   a magnet attached to the control button; and
   a wire coil in proximity to the magnet;
   and wherein the magnet is repelled by the wire coil when electric current is passed through the wire coil in a first direction, thereby resisting actuation of the control button;
   and wherein the force is adjustable by a user of the camera.

7. A camera of claim 6, wherein the magnet is attracted by the wire coil when electric current is passed through the wire coil in a second direction, opposite the first, thereby assisting actuation of the control button.

8. A camera of claim 6, wherein the magnitude of the current is adjustable.

9. A camera of claim 8, further comprising a user control that allows the user of the camera to specify the force required to actuate the control button.

10. A camera of claim 9, further comprising a control circuit that controls the magnitude of the current in response to a setting of the user control.

11. The camera of claim 6, wherein the camera is a film camera.

12. The camera of claim 6, wherein the camera is a digital camera.

13. The camera of claim 6, wherein the control button is a shutter release button.

14. A method, comprising the step of adjusting, by a user of a camera, a force required to actuate a control button of the camera, the adjustment comprising rotating the control button, thereby changing the length of a spring that resists the actuation of the control button.

15. A method, comprising adjusting, by a user of a camera, a force required to actuate a control button of the camera, the adjustment comprising:

passing electric current through a wire coil;

generating magnetic flux in the wire coil; and exerting a resulting force on a magnet that is in proximity to the wire coil, the resulting force resisting actuation of the control button.

\* \* \* \* \*

UNITED STATES PATENT AND TRADEMARK OFFICE
CERTIFICATE OF CORRECTION

PATENT NO. : 6,952,528 B2 Page 1 of 1
APPLICATION NO. : 10/727873
DATED : October 4, 2005
INVENTOR(S) : Mark N. Robins et al.

It is certified that error appears in the above-identified patent and that said Letters Patent is hereby corrected as shown below:

In column 4, line 45, in Claim 7, delete "A" and insert -- The --, therefor.

In column 4, line 49, in Claim 8, delete "A" and insert -- The --, therefor.

In column 4, line 51, in Claim 9, delete "A" and insert -- The --, therefor.

In column 4, line 54, in Claim 10, delete "A" and insert -- The --, therefor.

Signed and Sealed this

Twenty-fifth Day of August, 2009

David J. Kappos
*Director of the United States Patent and Trademark Office*